Dec. 29, 1942.    J. J. COBBS    2,306,524
WHEEL
Filed June 5, 1942    2 Sheets-Sheet 1
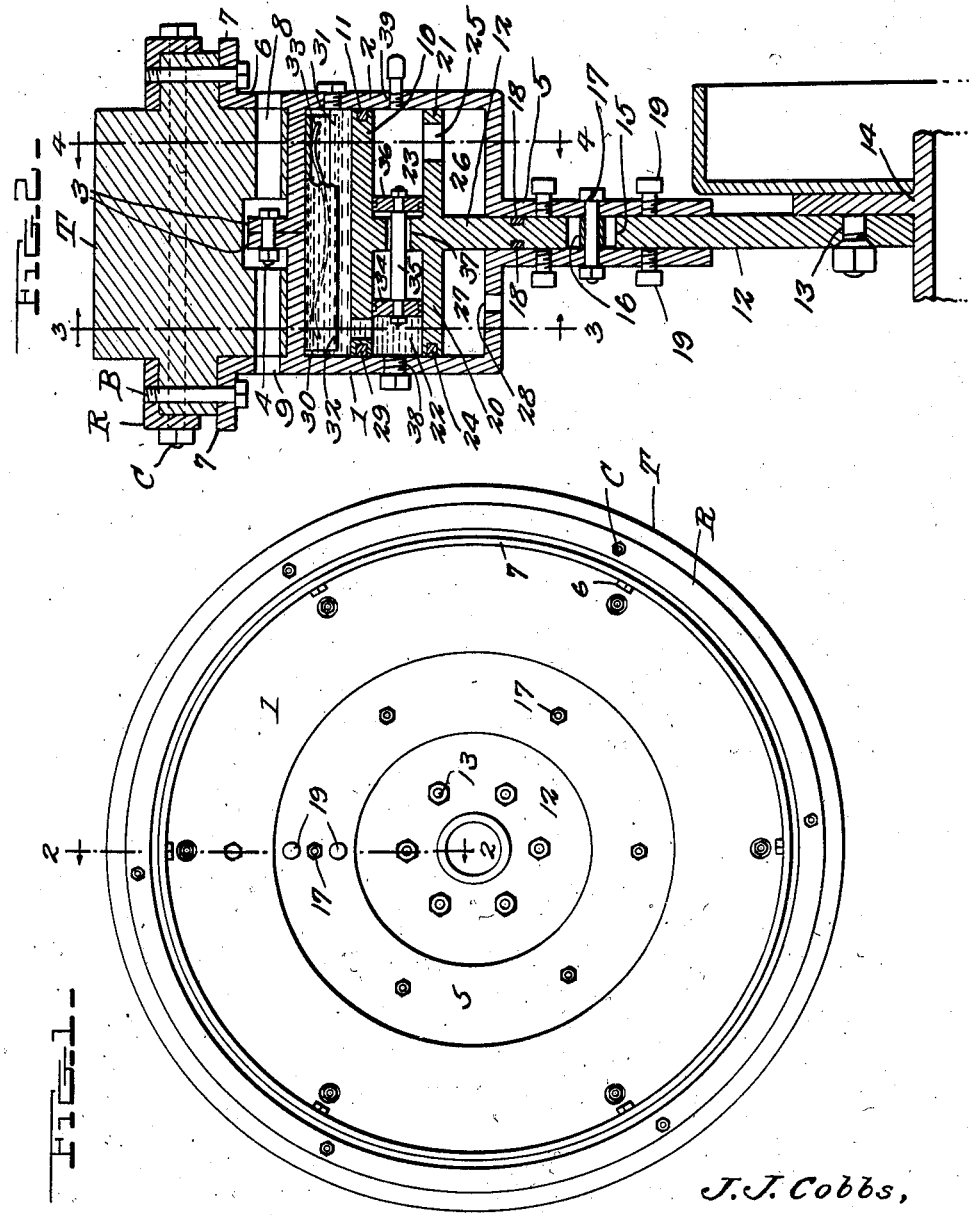
J. J. Cobbs,
INVENTOR.

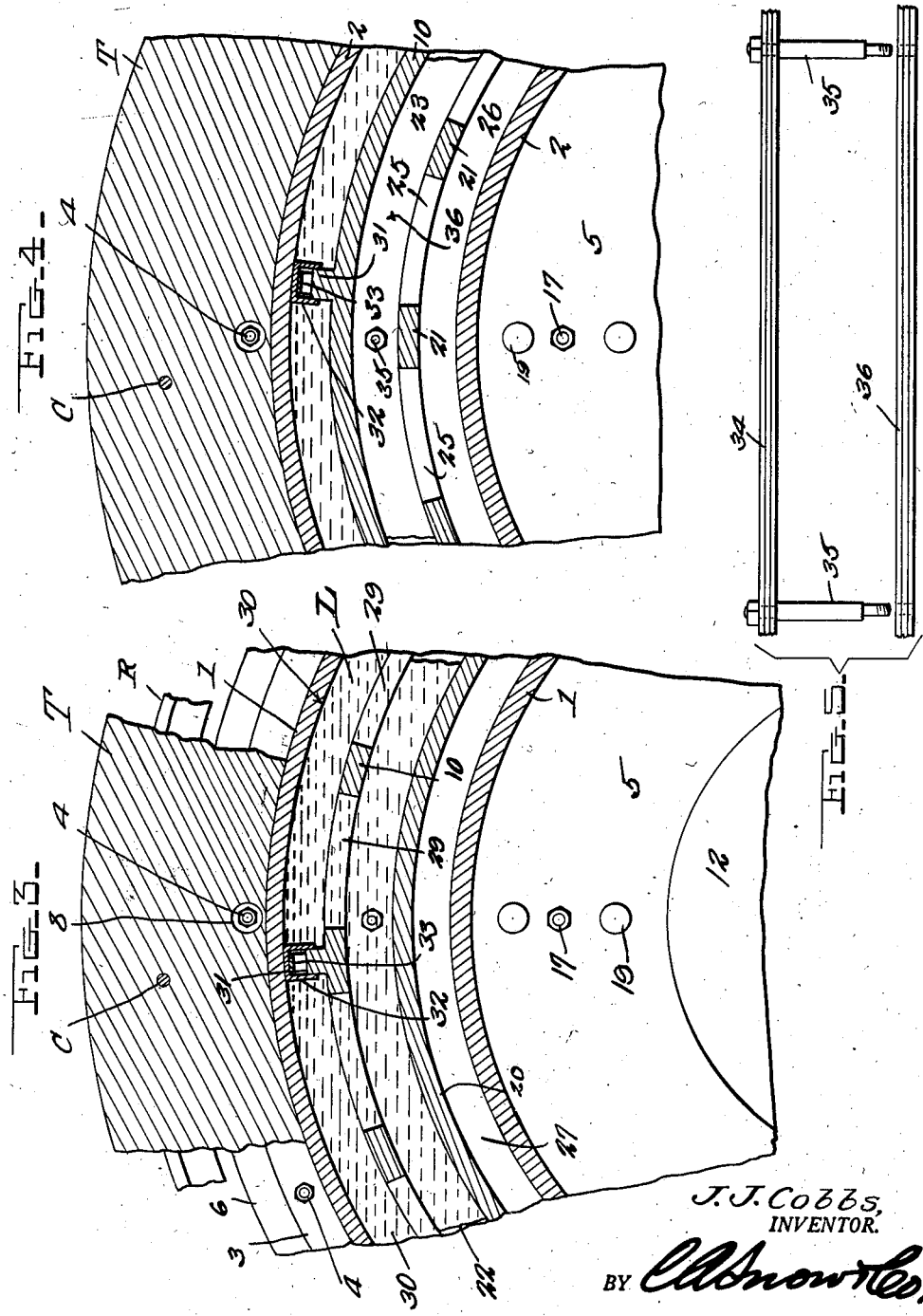

Patented Dec. 29, 1942

2,306,524

UNITED STATES PATENT OFFICE 2,306,524

WHEEL

John James Cobbs, Roanoke, Va.

Application June 5, 1942, Serial No. 445,927

8 Claims. (Cl. 152—55)

This invention relates to resilient wheels and is designed more especially as an improvement upon the structure disclosed in my co-pending application, filed May 18, 1942, Serial No. 443,479.

An object of the invention is to provide a vehicle wheel designed to absorb shocks without the use of rubber in any form, the general appearance of the wheel being similar to that of the ordinary wheel utilizing a pneumatic tire.

A further object is to provide a wheel of the type utilizing a fluid in the rim portion, the structure, in the present instance, also employing air under pressure which, in cooperation with the fluid, serves to absorb shocks.

A still further object is to simplify the construction of the wheel and to provide a wheel which can readily be placed in or taken from position and substituted for wheels commonly in use on vehicles.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In the drawings:

Figure 1 is a side elevation of a wheel embodying the present improvements.

Figure 2 is an enlarged section on line 2—2, Figure 1.

Figure 3 is an enlarged section on line 3—3, Figure 2.

Figure 4 is an enlarged section on line 4—4, Figure 2.

Figure 5 is a top plan view of portions of the plunger rings and their connections, the same being shown separated.

Referring to the figures by characters of reference, 1 and 2 designate opposed channelled rings which, when assembled, provide the annular casing or rim portion of the wheel, each of these members being provided, on its outer periphery, with a flange 3. The flanges on the two members are adapted to be detachably but firmly connected by bolts 4 located at desired intervals.

Inwardly extended flanges 5 are provided on the inner peripheries of the members 1 and 2 but are spaced apart as shown particularly in Fig. 2.

Annular side walls 6 are extended from the peripheries of the members 2 and formed with laterally extended annular flanges 7. These side walls and flanges constitute means for supporting and centering a tire T which can be formed of wooden blocks or any other suitable material and which can be clamped to the flanges 7 by means of rings R and bolts B while tie-bolts C can be extended transversely through the tire and the rings R for holding the parts against lateral displacement relative to each other. The tire can be provided with transverse bores 8 registering with openings 9 in the side walls 6 whereby access can be had to the bolts 4 when it is desired to tighten them after the tire and wheel have been assembled.

The members 1 and 2 cooperate to form an interior annular space which is rectangular in cross-section and mounted for reciprocation within this space is a ring piston 10 having a slidable but sealed contact with the side walls of the casing member as indicated at 11.

A central disk 12 is formed integral with the piston 10 which piston is located at the periphery of the disk. This disk 12 is located between the flanges 5 and can be attached in any suitable manner, as at 13, to the hub portion 14 of a wheel. For example the disk can be attached to the hub by bolts as indicated at 13 although other means could be used. Large circular openings 15 can be provided in the disk at points between the flanges 5 and located within these openings are spacing sleeves 16 which abut against the flanges and through which extend bolts 17 which serve to hold the flanges against movement away from the sides of the disk. Sealing rings 18 can be carried by the opposed faces of the disk for wiping engagement by the flanges 5 and grease cups 19 or the like can be employed for supplying lubricant to the surfaces of the parts 5 and 12.

Formed integral with the disk 12 and surrounded by but concentric with the ring piston 10 are oppositely extended annular flanges 20 and 21. Thus there is formed between the flange 20 and one side portion of piston 10 an annular chamber 22 while another annular chamber 23 is formed between the other side portion of ring piston 10 and the flange 21. Flange 20 has a sealed wiping contact with the adjacent side wall of member 1 through the provision of a sealing ring 24. Openings 25 maintain communication between the annular chamber 23 and an annular air chamber 26 located between flange 21 and the inner annular wall of the member 2. There is no communication between the annular chamber 22 and the annular space between flange 20 and the inner peripheral portion of the member 1.

Instead this latter annular chamber 27 opens to the outside atmosphere to any desired number of ports 28. The annular chamber 22 is in constant communication through slots 29 with the outer annular main chamber 30 formed between the ring piston 10 and the outer periphery of the members 1 and 2. This latter chamber 30 has means therein for retarding annular flow of liquid L which fills the chamber 30. Each of these retarding means includes a transverse fin or blade 31 on which is slidably mounted a box-like head 32 extending longitudinally of the blade and mounted to slide radially thereon. Springs 33 are interposed between the blades and the heads and serve to hold the heads pressed yieldingly against the inner surfaces of the outer annular walls of members 1 and 2. These heads do not extend entirely to the side walls of the members 1 and 2 in the structure illustrated but permit a small seepage of liquid past their ends. This arrangement is not essential, however, and, if desired, the heads could be extended up to the side walls so as to substantially cut off the annular flow of fluid.

Mounted for sliding movement in the annular chamber 22 is a ring plunger 34 having sealed sliding contacts with the opposed annular walls of the chamber 22. This plunger is connected by pins 35 to a ring plunger 36 having a sealed sliding contact with the annular walls of the chamber 23. Pins 35 work within openings 37 in disk 12, these openings being sufficiently large to allow air to flow freely therethrough from one chamber to the other.

A normally closed inlet 38 is provided in the member 1 and is located where oil or other liquid can be directed into chamber 22 and thence through openings 29 into chamber 30 thereby to fill chamber 30 and also completely fill that portion of chamber 22 between plunger 34 and the side wall of member 1. An air inlet opening 39 is provided in the member 2 and by means thereof air under high pressure can be forced into the annular chambers 23 and 26 thereby to hold the ring plunger 36 normally pressed against or close to the disk 12. It is while the plunger 36 is in this position that the chambers 30 and 22 are filled with liquid. The inlet 39 is of course sealed after air has been forced into the structure under pressure.

Normally the ring piston 10 is held concentric with the rim casing formed by the members 1 and 2, these relative positions of the parts being maintained by the springs 33. Normally, also, the ring plunger 34 is positioned substantially as shown in Fig. 2.

When the tire on the wheel is subjected to a shock, it will cause the casing formed by the members 1 and 2 to slide on disk 12 within the limits allowed by the openings 15 and this sliding movement will be resisted by the displacement of liquid through the slots 29 into the annular chamber 22. This displaced liquid added to that within the chamber 22, will drive the plunger 34 toward disk 12 and, in turn, drive the plunger 36 towards the side of member 2, thereby increasing the compression of the air within chambers 23 and 26. As the abrupt pressure on the wheel is relieved, the compressed air will force the plungers 36 and 34 back to their initial positions, thereby returning the liquid which previously had been displaced. Should any of the liquid within the annular chamber 30 have been displaced annularly past the heads 32, the springs 33 would tend to restore the piston 10 and rim casing 1—2 to their initial concentric positions while the slightly displaced liquid is thus permitted to return past the retarding or baffling means.

It will be noted that the communicating chambers 23 and 26 cooperate to provide a single compression chamber the volume of which is unchanged by the relative radial movement of the rim 1—2 and piston 10. The only change in volume occurs when the plunger 36 is thrust laterally away from its normal position and this of course results in increased compression of the air trapped within the compression chamber.

What is claimed is:

1. In a wheel an annular casing constituting a rim, a disk straddled and slidably engaged by the casing, a ring piston carried by the disk and within and slidably engaged by the casing, said piston and casing cooperating to provide an inner annular compressed air chamber at one side of the disk and an annular fluid chamber between the piston and the outer portion of the casing, and laterally movable means carried by the disk and within the casing for transmitting thrust from fluid in the casing to the air in the air chamber.

2. In a wheel an annular casing constituting a rim, a disk straddled and slidably engaged by the casing, a ring piston carried by the disk and within and slidably engaged by the casing, said piston and casing cooperating to provide an inner annular compressed air chamber at one side of the disk and an annular fluid chamber between the piston and the outer portion of the casing, and laterally movable means carried by the disk and within the casing for transmitting thrust from fluid in the casing to the air in the air chamber, said means including annular flanges extended in opposite directions from the disk and concentric with the piston, ring plungers between said flanges and the piston, and connections between the plungers, one of the plungers being exposed to the action of liquid in the casing and the other plunger working within the air chamber.

3. In a wheel an annular casing constituting a rim, a disk having its marginal portion straddled and slidably engaged by the casing, a ring piston carried by the disk and having a sealed working fit within the casing, said disk and piston cooperating to provide an annular liquid chamber at one side of the disk and an annular compressed air chamber at the other side of the disk, a liquid-operating plunger in one of the chambers, an air compressing plunger in the other chamber, and rigid connections between the plungers.

4. In a wheel an annular casing constituting a rim, a disk having its marginal portion straddled and slidably engaged by the casing, a ring piston carried by the disk and having a sealed working fit within the casing, said disk and piston cooperating to provide an annular liquid chamber at one side of the disk and an annular compressed air chamber at the other side of the disk, a liquid-operating plunger in one of the chambers, an air compressing plunger in the other chamber, rigid connections between the plungers, an annular main liquid chamber between the piston and the outer portion of the casing in constant communication with the liquid chamber, and liquid-baffling means between the piston and the casing.

5. In a wheel an annular casing constituting a rim, a disk straddled and slidably engaged by the casing, a ring piston at the periphery of the disk and having a sliding sealed contact with the casing, annular flanges on the disk and cooperating with the piston to provide an annular liquid chamber in the casing at one side of the disk and an annular air chamber in the casing at the other side of the disk, said piston cooperating with the outer portion of the casing to provide a main liquid chamber in communication through the piston with the inner liquid chamber, means in the outer liquid chamber for retarding annular flow of liquid in said chamber, ring plungers within the respective inner chambers, and rigid connections between the plungers, said connections being slidable transversely of the disk.

6. In a wheel an annular casing constituting a rim, a disk embraced and slidably engaged by the casing, a ring piston on the disk having a sealed working contact with the casing, said piston and casing cooperating to provide an outer annular chamber, a liquid sealed within said chamber, liquid-baffling means interposed between the piston and the outer portion of the casing, said disk, piston and casing cooperating to provide an annular chamber for holding air under compression, and means operating transversely within the disk and casing for transmitting thrust from the liquid for increasing compression of the air in the air chamber.

7. In a wheel an annular casing constituting a rim, a disk embraced and slidably engaged by the casing, a ring piston on the disk having a sealed working contact with the casing, said piston and casing cooperating to provide an outer annular chamber, a liquid sealed within said chamber, liquid-baffling means interposed between the piston and the outer portion of the casing, said disk, piston and casing cooperating to provide an annular chamber for holding air under compression, and means operating transversely within the disk and casing for transmitting thrust from the liquid for increasing compression of the air in the air chamber, said means including plungers mounted to work transversely of and within the casing, means for directing fluid from the main chamber for actuating the plungers in one direction to increase the compression of the air in the air chamber.

8. In a wheel an annular casing constituting a rim, a ring piston having a tight working fit in the casing and providing a main annular chamber between the piston and the outer periphery of the casing, a disk extending inwardly from the piston and projecting from and slidably engaged by the casing, said casing and disk having a sealed working contact, an annular flange on one side of the disk providing communicating outer and inner annular air compression chambers in one side portion of the casing, said chambers having a normally closed air inlet, an annular flange on the other side of the disk cooperating with the piston to provide an annular chamber in constant communication with the main annular chamber, a liquid filling the main chamber and extending into the outer chamber in communication therewith, connected plungers in the outer chambers at the two sides of the disk, and means in the main annular chamber for retarding the annular flow of liquid therein.

JOHN JAMES COBBS.